US007688919B1

(12) United States Patent
Hazanchuk

(10) Patent No.: US 7,688,919 B1
(45) Date of Patent: Mar. 30, 2010

(54) PARALLEL SAMPLES, PARALLEL COEFFICIENTS, TIME DIVISION MULTIPLEXING CORRELATOR ARCHITECTURE

(75) Inventor: Asher Hazanchuk, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 2392 days.

(21) Appl. No.: 09/891,710

(22) Filed: Jun. 26, 2001

(51) Int. Cl.
*H04L 27/06* (2006.01)
(52) U.S. Cl. .................................................... 375/343
(58) Field of Classification Search ................. 375/140, 375/142, 143, 150, 152, 267, 343, 354, 355, 375/364; 704/216, 218, 237, 263; 708/5, 708/422, 813; 342/108, 145, 189, 378
See application file for complete search history.

(56) References Cited

U.S. PATENT DOCUMENTS

| | | | | |
|---|---|---|---|---|
| 5,715,276 A | * | 2/1998 | Tran et al. ................... | 375/152 |
| 5,799,010 A | * | 8/1998 | Lomp et al. .................. | 370/335 |
| 5,982,811 A | * | 11/1999 | Harrison et al. ............. | 375/150 |
| 6,212,222 B1 | * | 4/2001 | Okubo et al. ................ | 375/149 |
| 6,212,223 B1 | * | 4/2001 | Okamoto .................... | 375/150 |
| 6,490,316 B1 | * | 12/2002 | Motegi et al. ............... | 375/150 |
| 6,522,706 B1 | * | 2/2003 | Bahai et al. ................. | 375/343 |
| 6,707,844 B1 | * | 3/2004 | Imaizumi et al. ........... | 375/148 |
| 6,728,298 B1 | * | 4/2004 | Okubo et al. ................ | 375/146 |

OTHER PUBLICATIONS

Ken Chapman, Paul Hardy, Andy Miller, and Maria George, CDMA Matched Filter Implementation in Virtex Devices, XILINX XAPP212 (v1.0), Mar. 31, 2000.

\* cited by examiner

*Primary Examiner*—Sam K Ahn
(74) *Attorney, Agent, or Firm*—L. Cho

(57) ABSTRACT

A method for managing a code sequence is disclosed. First intermediate correlation values for a first plurality of sample sequences are determined during a first clock cycle. Second intermediate correlation values for the first plurality of sample sequences are determined during a second clock cycle. Correlation outputs for the first plurality of sample sequences are determined from the first and second intermediate correlation values.

45 Claims, 10 Drawing Sheets

| CODE SEQUENCE | 1 | -1 | -1 | 1 | -1 | 1 | | | | | | |
|---|---|---|---|---|---|---|---|---|---|---|---|---|
| RECEIVED SAMPLE | 5 | 2 | -1 | 3 | 6 | -6 | 3 | -3 | 5 | 9 | -8 | -8 | 7 | 6 |

FIG. 6

| CODE SEQUENCE | 1 | -1 | -1 | 1 | -1 | 1 | | | | | | |
|---|---|---|---|---|---|---|---|---|---|---|---|---|
| RECEIVED SAMPLE | 5 | 2 | -1 | 3 | 6 | -6 | 3 | -3 | 5 | 9 | -8 | -8 | 7 | 6 |
| CORRELATION OUTPUT | -5 | 15 | -22 | 14 | 10 | -18 | 10 | -10 | -17 | | | | |

FIG. 10

PARALLEL SAMPLES, PARALLEL COEFFICIENTS, TIME DIVISION MULTIPLEXING CORRELATOR ARCHITECTURE

FIELD OF THE INVENTION

The present invention relates to the field of correlators. More specifically, the present invention relates to a correlator architecture for determining a synchronization point for a code sequence.

BACKGROUND

Code Division Multiple Access (CDMA) and Wideband Code Division Multiple Access (W-CDMA) are wireless communication standards. In CDMA and W-CDMA, a single frequency spectrum is shared by multiple users. In order to distinguish one wireless communication device from another, a unique code sequence is associated with each wireless communication device. Matched filters are used by wireless communication devices to identify code sequences embedded in transmitted signal samples. Matched filters may also be used to identify an amount of delay incurred for the transmission of signal samples between wireless communication devices. The matched filter is a correlator structure. Similar correlator structures are used for Random Access Channel (RACH) detectors.

Matched filters and RACH detectors typically require very high million instructions per second (MIPS) computation power. Depending on the parameters, the matched filter or the RACH detector can require execution of tens of billions or hundreds of billions of operations per second. The high MIPS computation power requirement of matched filters and RACH detectors exceed the capability of a single standard digital signal processing (DSP) processor. The use of a specialized DSP processor or multiple standard DSP processors to perform the computations required costs that were high and undesirable. Conventional usage of Programmable Logic Devices (PLDs) to perform the computations required the PLDs to include a large number of logic elements for the computations and a large number of registers for storing data and results from the matched filter or RACH. This translated into the need for additional real estate and costs that were also undesirable.

Thus, what is needed is a method and apparatus for implementing matched filters and RACH detectors to process code sequences and transmitted samples that is efficient and cost effective.

SUMMARY OF THE INVENTION

A method for managing a code sequence according to a first embodiment of the present invention is disclosed. First intermediate correlation values for a first plurality of sample sequences are determined during a first clock cycle. Second intermediate correlation values for the first plurality of sample sequences are determined during a second clock cycle. Correlation outputs for the first plurality of sample sequences are determined from the first and second intermediate correlation values.

A method for managing a code sequence according to a second embodiment of the present invention is disclosed. A first group of coefficients in the code sequence is processed with a first group of sample values in a received sample to determine a first intermediate correlation value during a first clock cycle. A second group of coefficients in the code sequence is processed with a second group of sample values in the received sample to determine a second intermediate correlation value during a second clock cycle. A correlation output is determined from the first and second intermediate correlation values.

A method for managing a code sequence according to a third embodiment of the present invention is disclosed. The code sequence, having a plurality of contiguous coefficients, is organized into a plurality of contiguous code sequence groups. A number of sample sequences to process in parallel is selected. Each of the sample sequences has contiguous sample values from a sample. Contiguous sample values from each of a first set of sample sequences to process in parallel is organized into a number of contiguous sample sequence groups. Coefficients in each of the code sequence groups are processed in parallel with corresponding sample values in corresponding sample sequence groups from the first set of sample sequences. Each of the code sequence groups is processed during a different clock cycle.

A method for managing a code sequence according to a fourth embodiment of the present invention is disclosed. The code sequence, having L contiguous coefficients, is organized into a number of contiguous code sequence groups having n coefficients each. A number of sample sequences, d, to process in parallel is selected. Each of the sample sequences has L contiguous sample values from a received sample. A first sample value in a first sample sequence includes a first sample value in the received sample and each consecutive sample sequence includes a next contiguous sample value in the sample as a first sample value in the consecutive sample sequence. Sample values from each of a first set of d sample sequences is organized into a first set of sample sequence groups having n sample values each. Coefficients in each of the code sequence groups are processed in parallel with corresponding sample values in corresponding sample sequence groups from the first set of d sample sequences. Each of the code sequence groups is processed during a different clock cycle.

A correlator unit according to a first embodiment of the present invention is disclosed. The correlator unit includes a plurality of code sequence registers that store coefficients from a code sequence group. The plurality of code sequence registers stores coefficients from one code sequence group of a plurality of code sequence groups at a time. The correlator unit includes a plurality of sample sequence registers that store sample values from a plurality of sample sequences that are processed in parallel. The correlator unit includes a processing unit that processes the coefficients in each of the code sequence groups in the plurality of code sequence registers in parallel with corresponding sample values in corresponding sample sequence groups from a first plurality of sample sequences in the plurality of sample sequence registers. Each of the code sequence groups is processed during a different clock cycle.

A correlator unit according to a second embodiment of the present invention is disclosed. The correlator includes a plurality of n code sequence registers that store n coefficients from a code sequence group. The plurality of n code sequence registers store coefficients from one code sequence group of a plurality of code sequence groups at a time. The correlator includes a plurality of n+d−1 sample sequence registers that store sample values from a plurality of d sample sequences that are processed in parallel. The correlator unit includes a processing unit that processes the coefficients in each of the plurality of code sequence groups in the plurality of n code sequence registers in parallel with corresponding sample values in corresponding sample sequence groups from a first plurality of d sample sequences in the plurality of n+d−1 sample sequence registers. Each of the code sequence groups is processed during a different clock cycle.

BRIEF DESCRIPTION OF THE DRAWINGS

The features and advantages of the present invention are illustrated by way of example and are by no means intended to limit the scope of the present invention to the particular embodiments shown, and in which:

FIG. 6 is a table of an exemplary code sequence and received sample to be processed by the correlator shown in FIG. 1;

FIG. 10 is a table of an exemplary code sequence, received sample, and correlation outputs calculated for sample sequence groups from the received sample.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well known circuits and devices are shown in block diagram form to avoid obscuring the present invention unnecessarily. Additionally, the interconnection between circuit elements or blocks may be shown as buses or as single signal lines. Each of the buses may alternatively be single signal lines, and each of the single signal lines may alternatively be buses.

Figure 1:
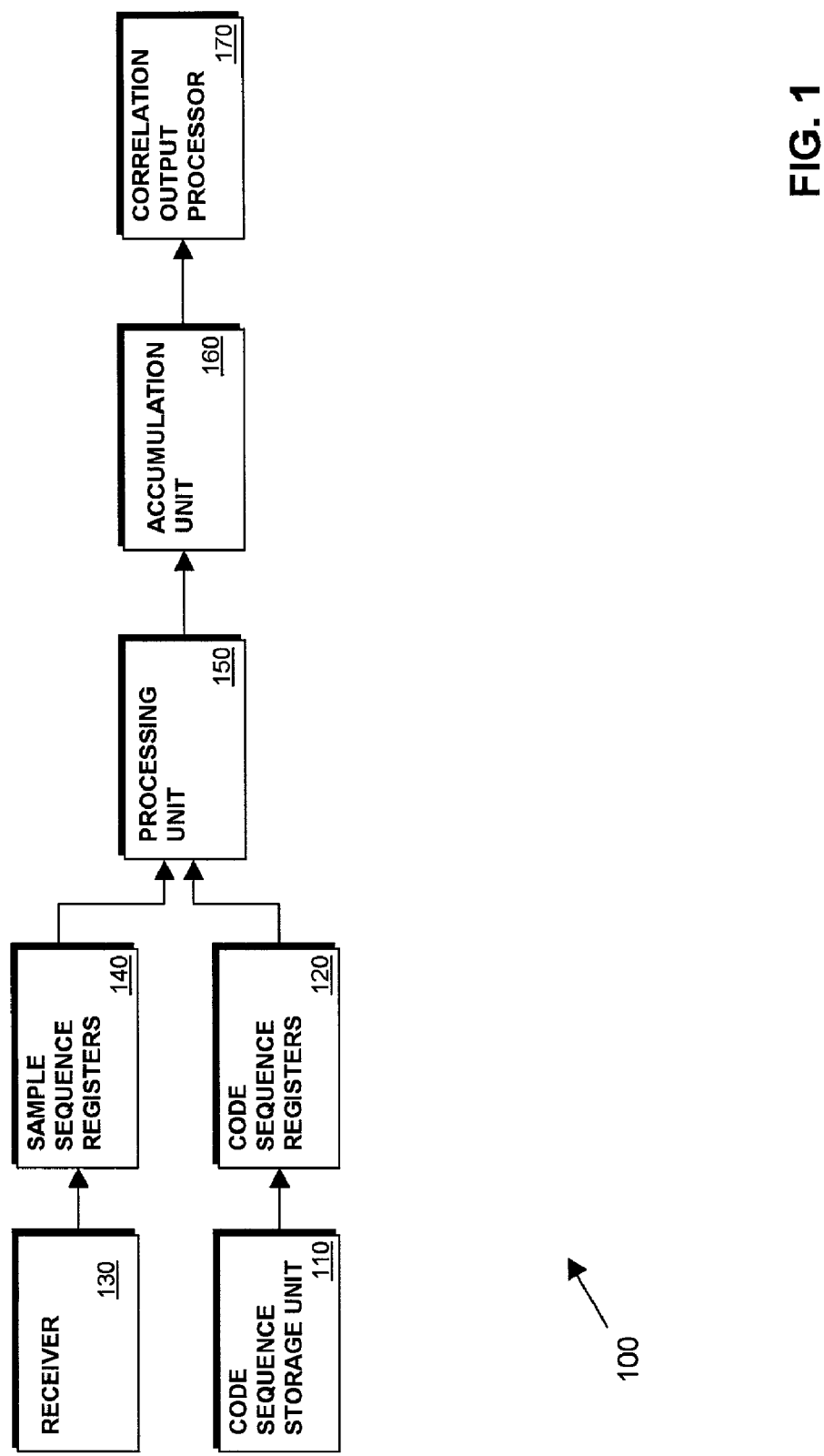
FIG. 1 is a block diagram illustrating a parallel samples, parallel coefficients, time division multiplexer (PPT) correlator according to an embodiment of the present invention.

FIG. 1 is a block diagram of a parallel samples, parallel coefficients, time division multiplexer (PPT) correlator 100 according to an embodiment of the present invention. The PPT correlator 100 may reside in a wireless communication device, a base station for a wireless communication device or other unit that manages code sequences. The PPT correlator 100 may operate to determine a delay in transmission of a sample between a wireless communication device and a base station by determining a synchronization point for the code sequence in the received sample.

The PPT correlator 100 includes a code sequence storage unit 110. The code sequence storage unit 110 stores a code sequence associated with the device. The code sequence storage 110 may be implemented by a memory, a register or other type of storage device. The code sequence includes a plurality of contiguous coefficients that may be organized into a plurality of contiguous code sequence groups. According to an embodiment of the present invention, the code sequence includes L contiguous coefficients which are organized into a plurality of contiguous code sequence groups having n coefficients each.

The PPT correlator 100 includes a plurality of code sequence registers 120. The code sequence registers 120 are connected to the code sequence storage 110. The code sequence registers 120 receive code sequence groups from the code sequence storage 110. The code sequence registers 120 may store coefficients of one code sequence group at a time for processing during each system clock cycle (clock cycle) of the PPT correlator 100. The code sequence registers 120 may be implemented by a shift registers or other storage device.

The PPT correlator 100 includes a receiver 130. The receiver 130 receives samples from a communication device (not shown). The receiver 130 may include an analog to digital converter and a storage device. The samples include a plurality of contiguous sample values. The samples may be organized into a plurality of sample sequences where each sample sequence includes a contiguous samples with length greater than L. According to an embodiment of the present invention, a first sample value in a first sample sequence includes a first sample value in the sample and each consecutive sample sequence includes a next contiguous sample value in the sample as a first sample value in the consecutive sample sequence. Each sample sequence may also be organized into a plurality of contiguous sample sequence groups having n sample values each. Each code sequence group of an order corresponds to a sample sequence group having the same order. Among corresponding code sequence and sample sequence groups, each order of coefficient in the code sequence group has a corresponding sample value of the same order in the sample sequence group.

The PPT correlator 100 includes a plurality of sample sequence registers 140. The sample sequence registers 140 are coupled to the receiver 130. The sample sequence registers 140 receive a plurality of sample values from the receiver 130. The sample sequence registers 140 may store sample values from a plurality of d sample sequences that are processed in parallel where all d sample sequences include sample values that are in each of the d sample sequences. The sample sequence registers 140 may store sample values from one complete sample sequence group from each of the plurality of d sample sequences at a time for processing during each clock cycle. The sample sequence registers 140 may be implemented by a register or other storage device.

According to an embodiment of the PPT correlator 100, the coefficients from the code sequence storage unit 110 and the sample values from the receiver 130 are stored in internal block memories (embedded system blocks or embedded array blocks). In this embodiment, there are no latency issues for context switching. It is possible to switch a next d shifted sample sequences or d shifted sample sequence groups from the receiver 130 into the sample sequence registers 140 for processing or to switch a next code sequence group from the code sequence storage unit 110 into the code sequence registers 120 for processing immediately at the next clock cycle.

The PPT correlator 100 includes a processing unit 150. The processing unit 150 processes the coefficients in the code sequence group stored in the code sequence registers 120 in parallel with corresponding sample values in corresponding sample sequence groups in the sample sequence registers 140. Each of the code sequence groups is processed during a different clock cycle of the PPT correlator 100.

The PPT correlator 100 include an accumulation unit 160. The accumulation unit 160 receives results from the processing unit 150 after each cycle and generates a correlation value for each of the sample sequences. After the processing unit 150 processes each of the code sequence groups with each corresponding sample sequence group, the accumulation unit 160 generates a correlation output for each sample sequence from the correlation values for the corresponding sample sequence. According to an embodiment of the present invention, the PPT correlator 100 may determine correlation outputs for a first d set of sample sequences after L/n clock cycles of the PPT correlator. Thereafter, the PPT correlator 100 may begin processing a second set of sample sequences to determine correlation outputs for the second set of d sample sequences. According to an embodiment of the PPT correlator 100, the accumulation unit 160 may be implemented by a plurality of adder trees or other summing device.

The PPT correlator 100 includes a correlation output processor 170. The correlation output processor 170 determines a synchronization point in a sample from the correlation outputs. According to an embodiment of the PPT correlator 100, the correlation output processor 170 determines that the first value of a sample sequence having a correlation output with the highest numerical value is the synchronization point.

It should be appreciated that the code sequence storage unit 110, code sequence registers 120, receiver 130, sample sequence registers 140, processing unit 150, accumulation unit 160, and correlation output processor 170 may be implemented using any known circuitry or technique. According to an embodiment of the PPT correlator 100, the code sequence storage unit 110, code sequence registers 120, receiver 130, sample sequence registers 140, processing unit 150, accumulation unit 160, and correlation output processor 170 all reside on a single semiconductor substrate. For example, the code sequence storage 110, code sequence registers 120, sample sequence registers 140, processing unit 150, accumulation unit 160, and correlation output processor 170 may be implemented using a programmable logic device.

Figure 2:
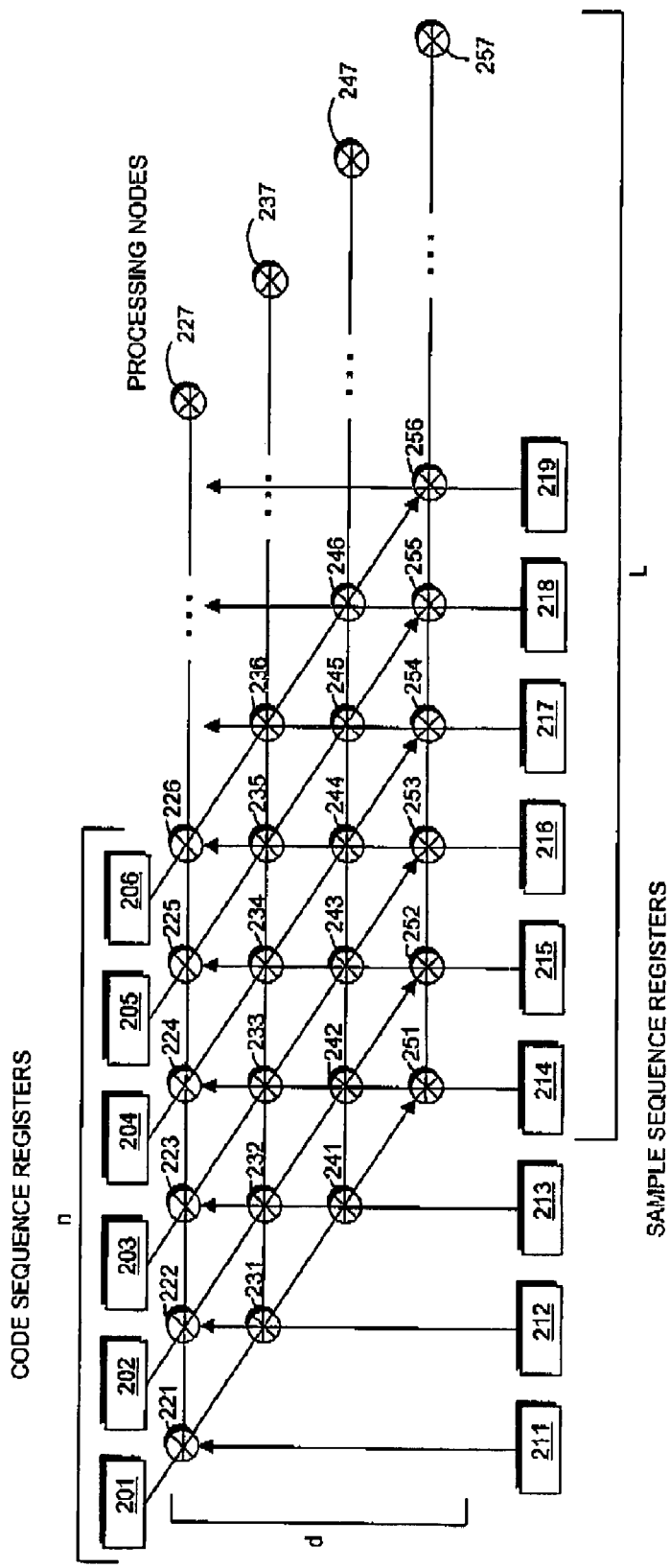
FIG. 2 illustrates conceptually how the PPT correlator shown in FIG. 1 processes correlation values for sample sequences according to an embodiment of the present invention.

FIG. 2 illustrates conceptually how the PPT correlator 100 shown in FIG. 1 processes correlation values for sample sequences according to an embodiment of the present invention. The code sequence stored in the code sequence storage 110 (shown in FIG. 1) may be organized into a plurality of contiguous code sequence groups each having n coefficients each. The code sequence registers 120 (shown in FIG. 1) store a code sequence group that is to be processed during a current clock cycle of the PPT correlator 100. Blocks 201-206 represent the code sequence registers 120. In this example, code sequence registers 201-206 are configured to store a code sequence group having n coefficients where n is 6. Register 201 may store a first coefficient of a code sequence group. Register 202 may store a second coefficient of a code sequence group. Register 203 may store a third coefficient of a code sequence group. Register 204 may store a fourth coefficient of a code sequence group. Register 205 may store a fifth coefficient of a code sequence group. Register 206 may store a sixth coefficient of a code sequence group.

The samples received and stored in receiver 130 (shown in FIG. 1) may be organized into a x+1−L contiguous sample sequences, where L is the number of coefficients in a coefficient sequence and x is the number of sample values in the sample. Each of the sample sequences includes a contiguous subset of L sample values from the samples. According to an embodiment of the present invention, a first value in a first sample sequence includes a first value in the sample and each consecutive sample sequence includes a next contiguous value in the sample as a first value in the consecutive sample sequence. Each sample sequence may also be organized into a plurality of contiguous sample sequence groups having n values each. The sample sequence registers 140 (shown in FIG. 1) store sample values from d sample sequences groups that are to be processed in parallel during a current clock cycle of the PPT correlator 100. Blocks 211-219 represent the sample sequence registers 140. In this example, the sample sequence registers 211-219 are configured to store n+d−1 sample values where d is 4. Registers 211-216 may store sample values from a first sample sequence group. Registers 212-217 may store sample values from a second sample sequence group. Registers 213-218 may store sample values from a third sample sequence group. Registers 214-219 may store sample values from a fourth sample sequence group.

Nodes 221-226, 231-236, 241-246, and 251-256 illustrate how the processing unit 150 (shown in FIG. 1) processes the coefficients stored in the code sequence registers 201-206 with the sample values stored in the sample sequence registers 211-219. Nodes 221-226 illustrate the calculations performed between coefficients stored in the code sequence registers 201-206 and the sample values stored in the sample sequence reference 211-216. Nodes 231-236 illustrate the calculations performed between coefficients stored in the code sequence registers 201-206 and the sample values stored in the sample sequence reference 212-217. Nodes 241-246 illustrate the calculations performed between coefficients stored in the code sequence registers 201-206 and the sample values stored in the sample sequence reference 213-218. Nodes 251-256 illustrate the calculations performed between coefficients stored in the code sequence registers 201-206 and the sample values stored in the sample sequence reference 214-219. According to an embodiment of the processing unit 150, the calculations are multiplications. The results of these calculations are forwarded to the accumulation unit 160 (shown in FIG. 1). The accumulation unit 160 takes the sum of the calculations represented by each row of nodes and determines a correlation value for each sample sequence group corresponding to each of the rows of nodes.

After completing the multiplications for a first code sequence group and a first sample sequence group for a first d set of sample sequences, code sequence registers 201-206 store coefficients for a next code sequence group and sample sequence registers 211-219 store sample values for next sample sequence groups for the first d set of sample sequences. Calculations are performed by the processing unit 150 until the last code sequence coefficient is processed with its corresponding sample values from the first set of d sample sequences. Nodes 227, 237, 247, and 257 represent the calculations performed by the processing unit 150 on a last code sequence coefficient with corresponding last sample values from a set of d sample sequences. Thereafter, if additional sets of sample sequences have not been processed, the code sequence registers 201-206 and the sample sequence registers 211-219 continue to load coefficients and sample values for the processing unit 150 to process.

The present invention utilizes time division multiplexing by processing coefficients and sample values from d sample sequences in parallel. This allows the PPT correlator 100 to reduce the number of registers required for calculating correlation outputs. Instead of utilizing L sample sequence registers for storing sample values, the PPT correlator 100 utilizes n+d−1 sample sequence registers. By processing only a subset of the code sequence and subset of the sample sequence during a clock cycle, the PPT correlator 100 need not implement registers for storing all the sample values at one time. By processing a subset of d sample sequences in parallel, the PPT correlator 100 is also reducing the input/output (I/O) bandwidth required by a factor of d.

It should be appreciated that the number of sample sequences, d, to process in parallel and the number of sample values to assign in a sample sequence group and coefficients to a code sequence group, n, may be selected to optimize the performance of the PPT correlator 100. According to an embodiment of the present invention, the ratio of the system clock cycle and the sample clock cycle has the following relationship with d and n: System Clock Cycle/Sample Clock Cycle=L/(d*n).

FIG. 2 illustrates exemplary code sequence registers 201-206 that store 6 coefficients during a clock cycle and exemplary sample sequence registers 211-219 that store sample sequence groups having 6 sample values from 4 sample sequences during a clock cycle. It should be appreciated that the PPT correlator 100 may implement code sequence registers that store any number of coefficients and sample sequence registers that store any number of sample sequence groups. FIG. 2 also illustrates nodes 221-227, 231-237, 241-247, and 251-257 that represent calculations that are performed by the processing unit 150 where the calculations are multiplications. It should be appreciated that the PPT correlator 100 may implement a processing unit 150 that performs other calculations and that each of the illustrated nodes 221-227, 231-237, 241-247, and 251-257 may represent a single or multiple calculations that may include functions other than multiplication.

Figure 3:
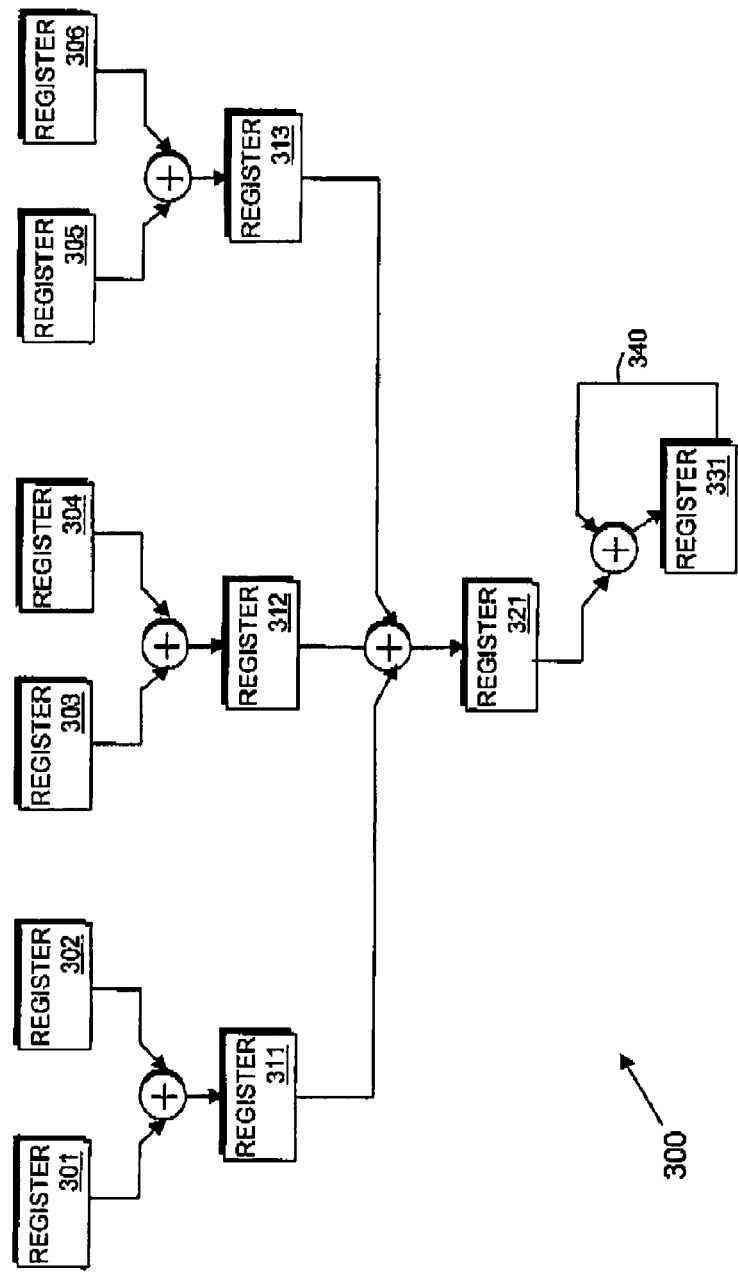
FIG. 3 illustrates an accumulator unit according to one embodiment of the present invention.

FIG. 3 illustrates an accumulator sub-unit 300 according to an embodiment of the accumulator unit 160 shown in FIG. 1. The accumulator unit 160 may include a plurality of accumulator sub-units 300. Each accumulator sub-unit may be designated to calculate correlation values and a correlation output for one of the d sample sequence processed by the processor unit 150 (shown in FIG. 1). The accumulator sub-unit 300 is an adder tree that includes a plurality of registers. In this example, the accumulator sub-unit 300 has six registers 301-306 and is thus configured to process a code sequence having a code sequence group with six coefficients and a sample sequence having a sample sequence group with six sample values.

In an example where sub-unit 300 is designated to calculate correlation values and a correlation output for a first sample sequence, registers 301-306 may receive the products generated by the calculations represented by nodes 221-226 (shown in FIG. 2), respectively. The products in registers 301 and 302 are summed together and output into register 311. The products in registers 303 and 304 are summed together and output into register 312. The products in registers 305 and 306 are summed together and output into register 313. The results from registers 311, 312, and 313 are summed together and output into register 321. The result in register 321 is the correlation value for the sample sequence group. As a correlation value for a next sample sequence group is generated by the sub-accumulation unit 300, the result in register 321 is fed back via feed back 340. The correlation value of the next sample sequence group is summed with all previous correlation values for the sample sequence and output into register 331. After L/n clock cycles, all the correlation values for a sample sequence will have been generated and summed together to generate a correlation output for the sample sequence.

Figure 4:
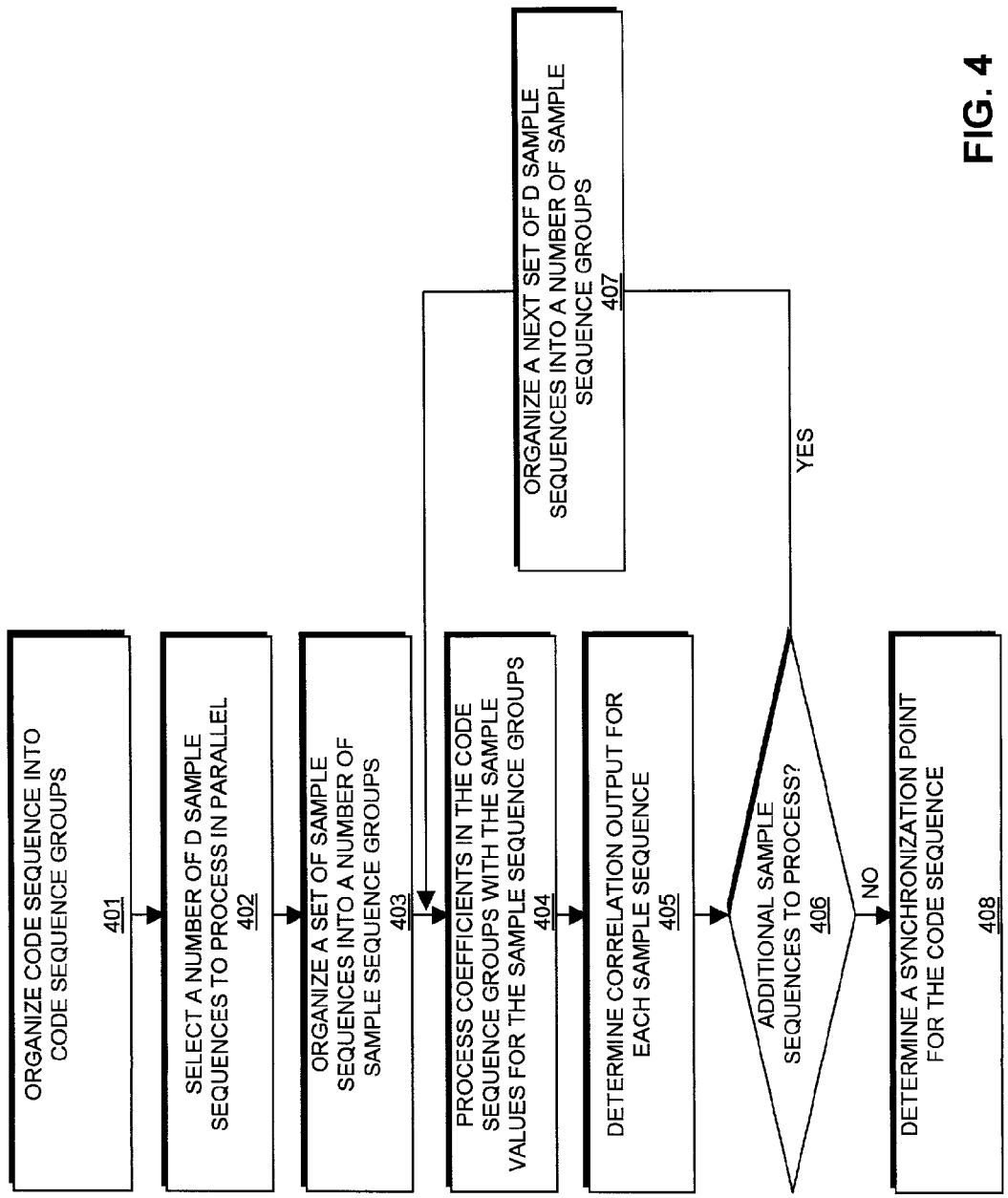
FIG. 4 is a flow chart illustrating a method for managing a code sequence according to an embodiment of the present invention.

FIG. 4 is a flow chart illustrating a method for managing a code sequence according to an embodiment of the present invention. At step 401, a code sequence, having L contiguous coefficients, is organized into a number of contiguous code sequence groups having n coefficients each. According to an embodiment of the present invention, the code sequence is organized into L/n code sequence groups.

At step 402, a number of d sample sequences are selected to process in parallel where each of the sample sequences has L contiguous sample values from a received sample. According to an embodiment of the present invention a first sample value in a first sample sequence is a first sample value in the received sample. Each consecutive sample sequence includes a next contiguous sample value in the received sample as a first sample value in the consecutive sample sequence.

At step 403, sample values from each of a set of d sample sequences are organized into a number of contiguous sample sequence groups having n values each. According to an embodiment of the present invention, each sample sequence has L/n contiguous sample sequence groups. Each order of a contiguous code sequence group has a corresponding contiguous sample sequence group of the same order. Among corresponding contiguous code sequence and contiguous sample sequence groups, each order of coefficient in the code sequence group has a corresponding sample value of the same order in the sample sequence group.

At step 404, coefficients in each of the code sequence groups are processed in parallel with corresponding sample values in corresponding sample sequence groups from the set of d sample sequences. Each of the code sequence groups is processed during a different clock cycle. According to an embodiment of the present invention, processing includes determining a sum of the products of the coefficients in each of the code sequence groups with each of the sample values in corresponding sample sequence groups from the set of d sample sequences. According to an embodiment of the present invention, the processing is completed after L/n clocks.

At step 405, a correlation output is determined for each of the sample sequences.

At step 406, it is determined whether correlation outputs need to be processed for additional sample sequences. If correlation outputs for additional sample sequences need to be processed, control proceeds to step 407. If correlation outputs need not be processed for additional sample sequences, control proceeds to step 408.

At step 407, sample values from each of a next set of d sample sequences are organized into a number of contiguous sample sequence groups having n values each. It should be appreciated that the set may include less than d sample sequences. Control proceeds to step 404.

At step 408, a synchronization point for the code sequence is determined from the correlation outputs. According to an embodiment of the present invention, determining a synchronization point comprises determining a correlation output having a highest numerical value.

Figure 5:
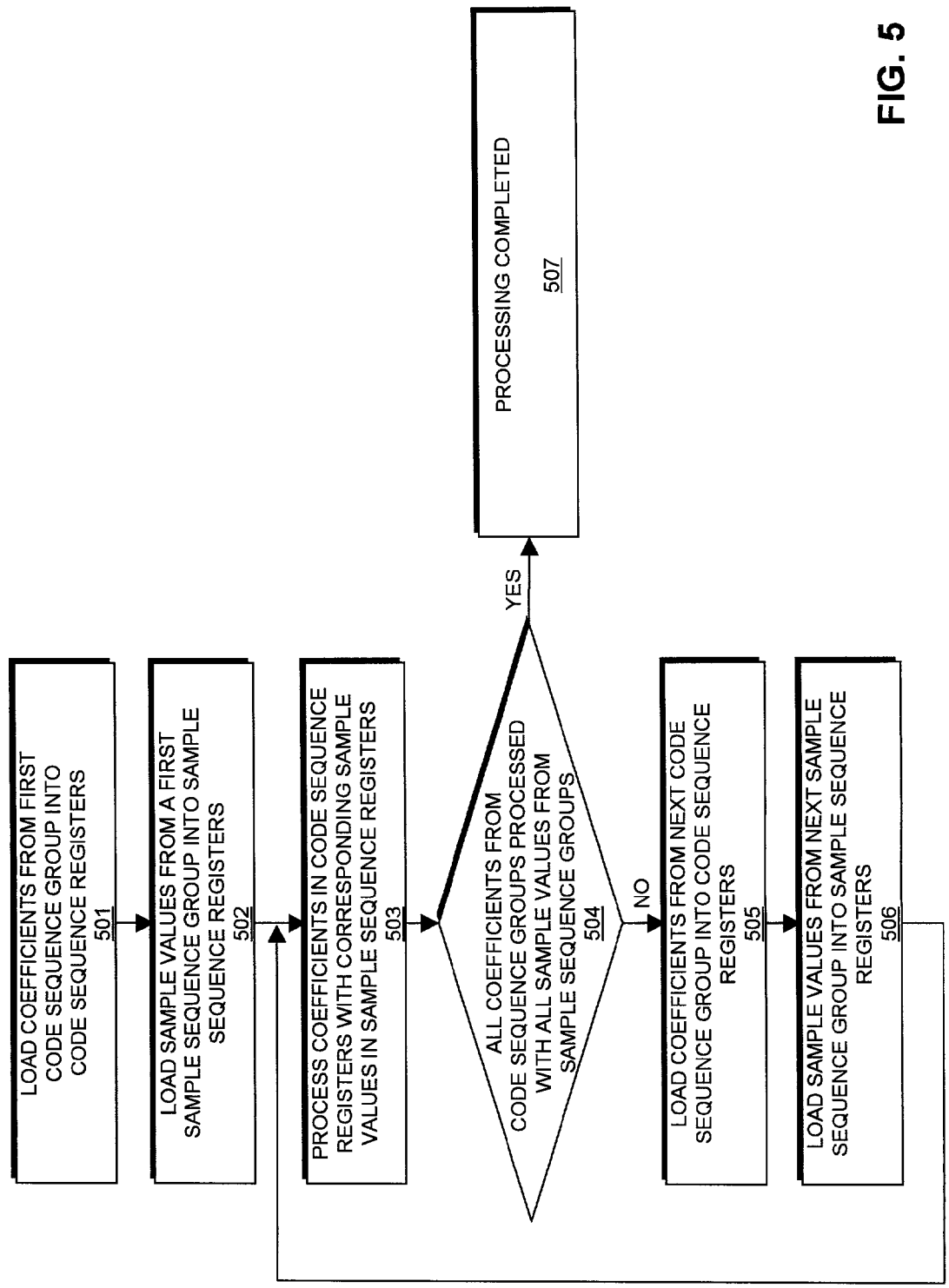
FIG. 5 is a flow chart illustrating a method for processing coefficients in the code sequence groups with sample values in the sample sequence groups according to an embodiment of the present invention.

FIG. 5 is a flow chart illustrating a method for processing coefficients in the code sequence groups with sample values in the sample sequence groups, as described in step 404 of FIG. 4, according to an embodiment of the present invention. At step 501, coefficients from a first code sequence group are loaded into code sequence registers. According to an embodiment of the present invention, n coefficients are loaded into the code sequence registers.

At step 502, sample values from a first sample sequence group from a set of d sample sequences are loaded into sample sequence registers. According to an embodiment of the present invention, n+d−1 sample values are loaded into the sample sequence registers.

At step 503, coefficients in the code sequence group in the code sequence registers are processed in parallel with corresponding sample values in corresponding sample sequence groups in the sample sequence registers. Correlation values are determined for each sample sequence group from the processing.

At step 504, it is determined whether all the coefficients from the code sequence groups have been processed with all the sample values from the sample sequence groups. If not all the coefficients in the code sequence groups have been processed with all the sample values from the sample sequence groups, control proceeds to step 505. If all the coefficients in the code sequence groups have been processed with all the sample values from the sample sequence groups, control proceeds to step 507.

At step 505, coefficients from a next contiguous code sequence group are loaded into the code sequence registers.

At step 506, sample values from a next contiguous sample sequence group from the set of d sample sequences is loaded into the sample sequence registers. According to an embodiment of the present invention, the last d−1 sample values from the previous sample sequence groups are among the sample values re-loaded into the sample sequence registers. Control proceeds to step 503.

At step 507, control determines that processing the coefficients in the code sequence groups with the sample values in the set of d sample sequence is completed.

FIGS. 5 and 6 illustrate flow charts describing a method for managing a code sequence and a method for processing coefficients from a code sequence group with sample values from sample sequences according to embodiments of the present invention. Some of the steps illustrated in these figures may be performed sequentially or in an order other than that which is described. It should be appreciated that not all of the steps described are required to be performed, that additional steps may be added, and that some of the illustrated steps may be substituted with other steps.

FIG. 6 is a table of exemplary coefficients from a code sequence and sample values from a received sample to be processed by the PPT correlator 100 shown in FIG. 1. The code sequence includes a plurality of contiguous coefficients 1 −1 −1 1 −1 1. The code sequence may be stored in the code sequence storage 110 (shown in FIG. 1). In this example, the code sequence has L contiguous coefficients where L equals 6. The code sequence may be organized into a plurality of contiguous code sequence groups. In this example, the code sequence is organized into two contiguous code sequence groups having n coefficients each where n equals 3. The first code sequence group has the coefficients 1 −1 −1. The second code sequence group has the coefficients 1 −1 1.

FIG. 6 also illustrates a plurality of samples having the sample values 5 2 −1 3 6 −6 3 −3 5 9 −8 −8 7 [−]6. The sample values may be received and stored in receiver 130 (shown in FIG. 1). In this example, the sample has x contiguous sample values where x equals 14. The sample values may be organized into x+1−L contiguous sample sequences where each of the sample sequences includes a contiguous subset of L sample values from the sample. According to an embodiment of the present invention, a first sample value in a first sample sequence includes a first sample value in the sample and each consecutive sample sequence includes a next contiguous sample value in the sample as a first value in the consecutive sample sequence. In this example, a first sample sequence includes the sample values 5 2 −1 3 6 −6. A second sample sequence includes the sample values 2 −1 3 6 −6 3. A third sample sequence includes the sample values −1 3 6 −6 3 −3. A fourth sample sequence includes the sample values 3 6 −6 3 −3 5. A fifth sample sequence includes the sample values 6 −6 3 −3 5 9. A sixth sample sequence includes the sample values −6 3 −3 5 9 −8. A seventh sample sequence includes the sample values 3 −3 5 9 −8 −8. An eighth sample sequence includes the sample values −3 5 9 −8 −8 7. A ninth sample sequence includes the sample values 5 9 −8 −8 7 6.

Each sample sequence may also be organized into a plurality of contiguous sample sequence groups having n sample values each. In this example, the first sample sequence includes a first sample sequence group having sample values 5 2 −1 and a second sample sequence group having sample values 3 6 −6. The second sample sequence includes a first sample sequence group having sample values 2 −1 3 and a second sample sequence group having sample values 6 −6 3. The third sample sequence includes a first sample sequence group having sample values −1 3 6 and a second sample sequence group having sample values −6 3 −3. The fourth sample sequence includes a first sample sequence group having sample values 3 6 −6 and a second sample sequence group having sample values 3 −3 5. The fifth sample sequence includes a first sample sequence group having sample values 6 −6 3 and a second sample sequence group having sample values −3 5 9. The sixth sample sequence includes a first sample sequence group having sample values −6 3 −3 and a second sample sequence group having sample values 5 9 −8. The seventh sample sequence includes a first sample sequence group having sample values 3 −3 5 and a second sample sequence group having sample values 9 −8 −8. The eighth sample sequence includes a first sample sequence group having sample values −3 5 9 and a second sample sequence group having sample values −8 −8 7. The ninth sample sequence includes a first sample sequence group having sample values 5 9 −8 and a second sample sequence group having sample values −8 7 6. Each order code sequence group corresponds to a sample sequence group of the same order. Thus, the first code sequence group corresponds to the first sample sequence groups of the first through x+1−Lth sample sequence and the second code sequence group corresponds to the second sample sequence groups of the first through x+1−Lth sample sequence. Furthermore, each order of contiguous value in each of the code sequence groups corresponds to a value of the same order in a corresponding sample sequence group.

The PPT correlator 100 generates a correlation output for each sample sequence. According to an embodiment of the PPT correlator 100, the correlation output is calculated from the sum of products between corresponding coefficient values from a code sequence and sample values from a correlation sequence. The PPT correlator 100 determines the correlation output for each of the sample sequences by processing a plurality of sample values and a plurality of code sequence values in parallel. The code sequence registers 120 (shown in FIG. 1) store values from one code sequence group at a time for processing.

Figure 7A:
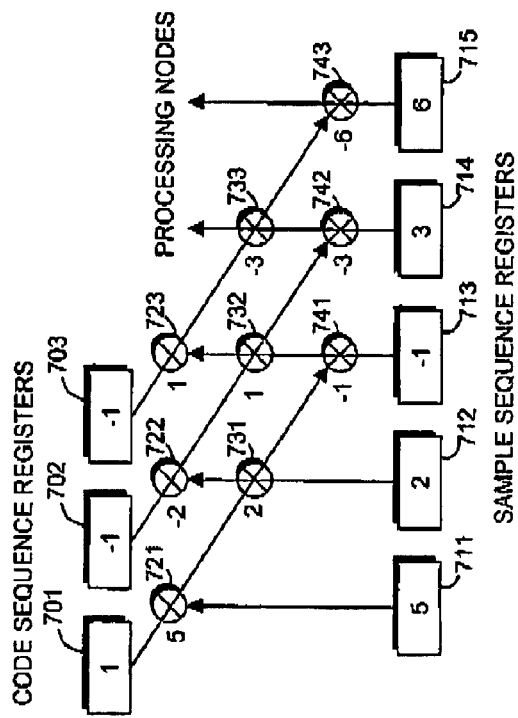
FIG. 7a illustrates an example of how the PPT correlator shown in FIG. 1 conceptually manages the code sequence shown in FIG. 6 during a first clock cycle according to an embodiment of the present invention.

FIGS. 7-9 illustrate an example of how the PPT correlator 100 shown in FIG. 1 conceptually manages the code sequence shown in FIG. 6 according to an embodiment of the present invention. FIG. 7a illustrates how the PPT correlator 100 manages the code sequence during a first clock cycle. During the first clock cycle, code sequence registers 701-703 store n values from the first code sequence group. In this example, n equals 3 and the code sequence registers 701-703 store the values 1 −1 −1 of the first code sequence group. The sample sequence registers 711-715 store n+d−1 sample values from the sample to allow the processing unit 150 to process sample values from d sample sequences in parallel. In this example, d equals 3 and sample sequence registers 711-715 store the values 5 2 −1 3 6 from the samples. These sample values correspond to the first sample sequence groups of the first, second, and third sample sequences.

As shown in FIG. 7a, the processing unit 150 (as shown in FIG. 1) accesses the coefficients from the code sequence registers 701-703 and the sample values from the sample sequence registers 711-715 and multiplies each coefficient in the code sequence group with its corresponding sample values. Nodes 721-723, 731-733, and 741-743 illustrate how the processing unit 150 processes the coefficients stored in the code sequence registers 701-703 with the sample values stored in the sample sequence registers 711-715. For example, in the row containing nodes 721-723, node 721 represents the multiplication performed between the coefficient stored in code sequence register 701 and the sample value stored in sample sequence register 711. Node 722 represents the multiplication performed between the coefficient stored in code sequence register 722 and the sample value stored in sample sequence register 712. Node 723 represents the multiplication performed between the coefficient stored in code sequence register 703 and the sample value stored in sample sequence register 713.

The results generated by the calculations represented by nodes 721-723 are 5, −2, and 1 respectively. These results are forwarded to a first accumulator sub-unit that determines a correlation value 4 for the first sample sequence group for the first sample sequence. The results generated by the calculations represented by nodes 731-733 are 2, 1, and −3 respectively. These results are forwarded to a second accumulator sub-unit that determines a correlation value 0 for the first sample sequence group for the second sample sequence. The results generated by the calculations represented by nodes 741-743 are −1 −3 and −6 respectively. These results are forwarded to a third accumulator sub-unit that determines a correlation value −10 for the first samples sequence group for the third sample sequence.

Figure 7B:
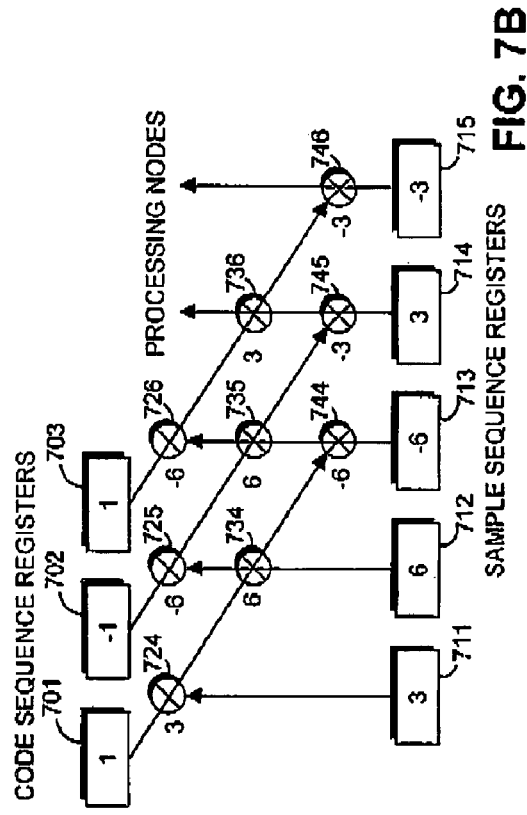
FIG. 7b illustrates an example of how the PPT correlator shown in FIG. 1 conceptually manages the code sequence shown in FIG. 6 during a second clock cycle according to an embodiment of the present invention.

FIG. 7b, illustrates how the PPT correlator 100 manages the code sequence during a second clock cycle. During the second clock cycle, code sequence registers 701-703 store n values from the second code sequence group. In this example, n equals 3 and the code sequence registers 701-703 store the values 1 −1 1 of the second code sequence group. The sample sequence registers 711-715 store n+d−1 sample values from the sample to allow the processing unit 150 to process d samples in parallel. In this example, d equals 3 and sample sequence registers 711-715 store the values 3 6 −6 3 −3 from the samples. These sample values correspond to the second sample sequence groups of the first, second, and third sample sequences.

As shown in FIG. 7b, the processing unit 150 accesses the coefficients from the code sequence registers 701-703 and the sample values from the sample sequence registers 711-715 and multiplies each coefficient in the code sequence group with its corresponding sample values. Nodes 724-726, 734-736, and 744-746 illustrate how the processing unit 150 processes the coefficients stored in the code sequence registers 701-703 with the sample values stored in the sample sequence registers 711-715.

The results generated by the calculations represented by nodes 724-726 are 3, −6, and −6 respectively. These results are forwarded to the first accumulator sub-unit that determines a correlation value −9 for the second sample sequence group for the first sample sequence. The first accumulator sub-unit adds this correlation value with the sum of the previously calculated correlation values to determine a correlation output of −5 for the first sample sequence. The results generated by the calculations represented by nodes 734-736 are 6, 6, and 3 respectively. These results are forwarded to the second accumulator sub-unit that determines a correlation value 15 for the second sample sequence group for the second sample sequence. The second accumulator sub-unit adds this correlation value with the sum of the previously calculated correlation values to determine a correlation output of 15 for the second sample sequence. The results generated by the calculations represented by nodes 744-746 are −6 −3 and −3 respectively. These results are forwarded to the third accumulator sub-unit that determines a correlation value −12 for the second sample sequence group for the third sample sequence. The third accumulator sub-unit adds this correlation value with the sum of the previously calculated correlation value to determine a correlation output of −22 for the third sample sequence.

Figure 8A:
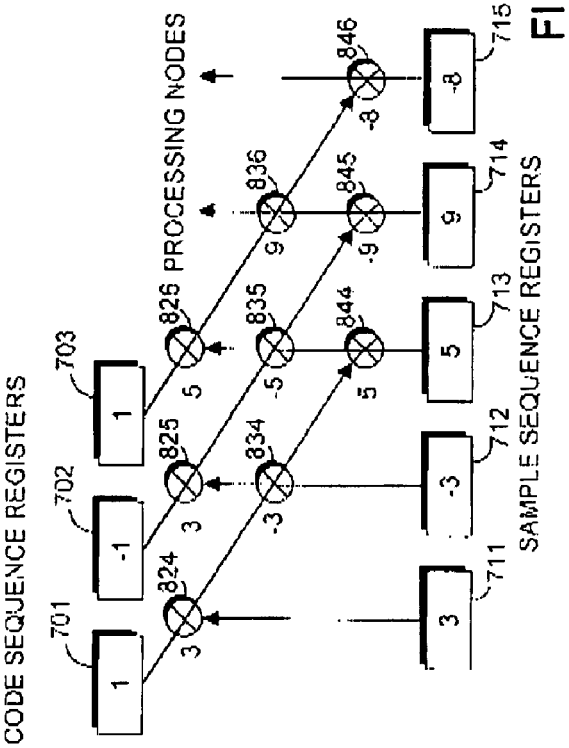
FIG. 8a illustrates an example of how the PPT correlator shown in FIG. 1 conceptually manages the code sequence shown in FIG. 6 during a third clock cycle according to an embodiment of the present invention.

FIG. 8a illustrates how the PPT correlator 100 manages the code sequence during a third clock cycle. During the third clock cycle, code sequence registers 701-703 store n values from the first code sequence group. In this example, n equals 3 and the code sequence registers 701-703 store the values 1 −1 −1 of the first code sequence group. The sample sequence registers 711-715 store n+d−1 sample values from the sample to allow the processing unit 150 to process sample values from d sample sequences in parallel. In this example, d equals 3 and sample sequence registers 711-715 store the values 3 6 −6 3 −3 from the samples. These sample values correspond to the first sample sequence groups of the fourth, fifth, and sixth sample sequences.

As shown in FIG. 8a, the processing unit 150 (shown in FIG. 1) accesses the coefficients from the code sequence registers 701-703 and the sample values from the sample sequence registers 711-715 and multiplies each coefficient in the code sequence group with its corresponding sample values. Nodes 821-823, 831-833, and 841-843 illustrate how the processing unit 150 processes the coefficients stored in the code sequence registers 701-703 with the sample values stored in the sample sequence registers 711-715.

The results generated by the calculations represented by nodes 821-823 are 3, −6, and 6 respectively. These results are forwarded to a first accumulator sub-unit that determines a correlation value 3 for the first sample sequence group for the fourth sample sequence. The results generated by the calculations represented by nodes 831-833 are 6, 6, and −3 respectively. These results are forwarded to a second accumulator sub-unit that determines a correlation value 9 for the first sample sequence group for the fifth sample sequence. The results generated by the calculations represented by nodes 841-843 are −6 −3 and 3 respectively. These results are forwarded to a third accumulator sub-unit that determines a correlation value −6 for the first samples sequence group for the sixth sample sequence.

Figure 8B:
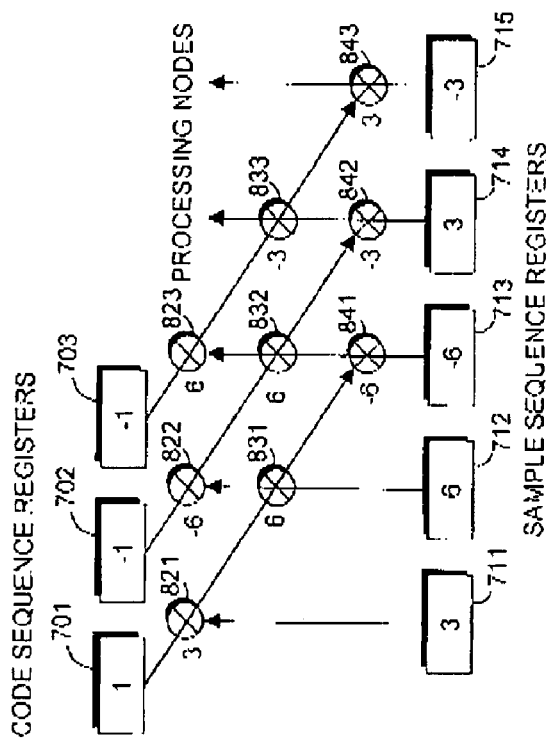
FIG. 8b illustrates an example of how the PPT correlator shown in FIG. 1 conceptually manages the code sequence shown in FIG. 6 during a fourth clock cycle according to an embodiment of the present invention.

FIG. 8b, illustrates how the PPT correlator 100 manages the code sequence during a fourth clock cycle. During the fourth clock cycle, code sequence registers 701-703 store n values from the second code sequence group. In this example, n equals 3 and the code sequence registers 701-703 store the values 1 −1 1 of the second code sequence group. The sample sequence registers 711-715 store n+d−1 sample values from the sample to allow the processing unit 150 to process d samples in parallel. In this example, d equals 3 and sample sequence registers 711-715 store the values 3 −3 5 9 −8 from the samples. These sample values correspond to the second sample sequence groups of the fourth, fifth, and sixth sample sequences.

As shown in FIG. 8b, the processing unit 150 accesses the coefficients from the code sequence registers 701-703 and the sample values from the sample sequence registers 711-715 and multiplies each coefficient in the code sequence group with its corresponding sample values. Nodes 824-826, 834-836, and 844-846 illustrate how the processing unit 150 processes the coefficients stored in the code sequence registers 701-703 with the sample values stored in the sample sequence registers 711-715.

The results generated by the calculations represented by nodes 824-826 are 3, 3, and 5 respectively. These results are forwarded to the first accumulator sub-unit that determines a correlation value 11 for the second sample sequence group for the fourth sample sequence. The first accumulator sub-unit adds this correlation value with the sum of the previously calculated correlation values to determine a correlation output of 14 for the fourth sample sequence. The results generated by the calculations represented by nodes 834-836 are −3, −5, and 9 respectively. These results are forwarded to the second accumulator sub-unit that determines a correlation value 1 for the second sample sequence group for the fifth sample sequence. The second accumulator sub-unit adds this correlation value with the sum of the previously calculated correlation values to determine a correlation output of 10 for the fifth sample sequence. The results generated by the calculations represented by nodes 844-846 are 5 −9 and −8 respectively. These results are forwarded to the third accumulator sub-unit that determines a correlation value −12 for the second sample sequence group for the sixth sample sequence. The third accumulator sub-unit adds this correlation value with the sum of the previously calculated correlation value to determine a correlation output of −18 for the sixth sample sequence.

Figure 9A:
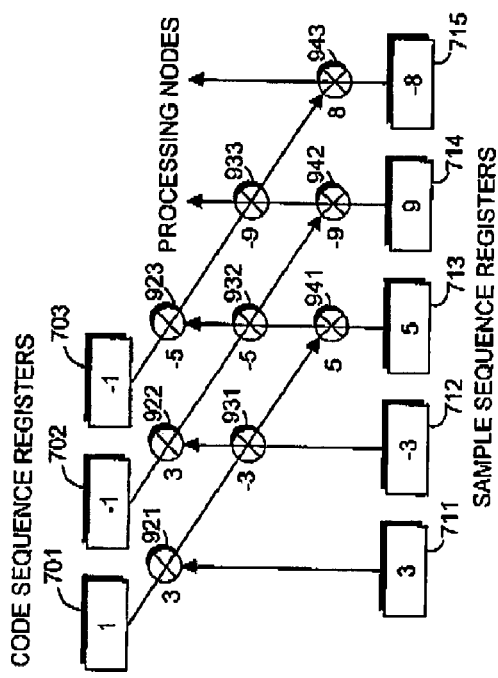
FIG. 9a illustrates an example of how the PPT correlator shown in FIG. 1 conceptually manages the code sequence shown in FIG. 6 during a fifth clock cycle according to an embodiment of the present invention.

FIG. 9a illustrates how the PPT correlator 100 manages the code sequence during a fifth clock cycle. During the fifth clock cycle, code sequence registers 701-703 store n values from the first code sequence group. In this example, n equals 3 and the code sequence registers 701-703 store the values 1 −1 −1 of the first code sequence group. The sample sequence registers 711-715 store n+d−1 sample values from the sample to allow the processing unit 150 to process sample values from d sample sequences in parallel. In this example, d equals 3 and sample sequence registers 711-715 store the values 3 −3 5 9 −8 from the samples. These sample values correspond to the first sample sequence groups of the seventh, eighth, and ninth sample sequences.

As shown in FIG. 9a, the processing unit 150 (shown in FIG. 1) accesses the coefficients from the code sequence registers 701-703 and the sample values from the sample sequence registers 711-715 and multiplies each coefficient in the code sequence group with its corresponding sample values. Nodes 921-923, 931-933, and 941-943 illustrate how the processing unit 150 processes the coefficients stored in the code sequence registers 701-703 with the sample values stored in the sample sequence registers 711-715.

The results generated by the calculations represented by nodes 921-923 are 3, 3, and −5 respectively. These results are forwarded to a first accumulator sub-unit that determines a correlation value 1 for the first sample sequence group for the seventh sample sequence. The results generated by the calculations represented by nodes 931-933 are −3, −5 and −9 respectively. These results are forwarded to a second accumulator sub-unit that determines a correlation value −17 for the first sample sequence group for the eighth sample sequence. The results generated by the calculations represented by nodes 941-943 are 5, −9 and 8 respectively. These results are forwarded to a third accumulator sub-unit that determines a correlation value 4 for the first samples sequence group for the ninth sample sequence.

Figure 9B:
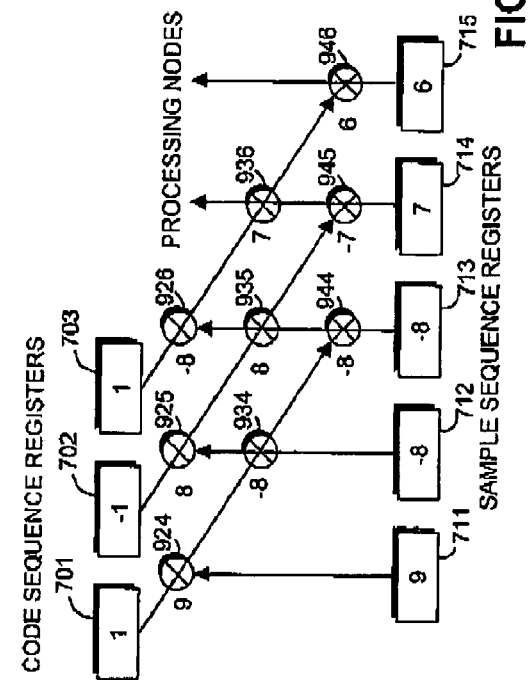
FIG. 9b illustrates an example of how the PPT correlator shown in FIG. 1 conceptually manages the code sequence shown in FIG. 6 during a sixth clock cycle according to an embodiment of the present invention.

FIG. 9b, illustrates how the PPT correlator 100 manages the code sequence during a sixth clock cycle. During the sixth clock cycle, code sequence registers 701-703 store n values from the second code sequence group. In this example, n equals 3 and the code sequence registers 701-703 store the values 1 −1 1 of the second code sequence group. The sample sequence registers 711-715 store n+d−1 sample values from the sample to allow the processing unit 150 to process d samples in parallel. In this example, d equals 3 and sample sequence registers 711-715 store the values 9 −8 −8 7 6 from the samples. These sample values correspond to the second sample sequence groups of the seventh, eighth, and ninth sample sequences.

As shown in FIG. 9b, the processing unit 150 accesses the coefficients from the code sequence registers 701-703 and the sample values from the sample sequence registers 711-715 and multiplies each coefficient in the code sequence group with its corresponding sample values. Nodes 924-926, 934-936, and 944-946 illustrate how the processing unit 150 processes the coefficients stored in the code sequence registers 701-703 with the sample values stored in the sample sequence registers 711-715.

The results generated by the calculations represented by nodes 924-926 are 9, 8, and −8 respectively. These results are forwarded to the first accumulator sub-unit that determines a correlation value 9 for the second sample sequence group for the seventh sample sequence. The first accumulator sub-unit adds this correlation value with the sum of the previously calculated correlation values to determine a correlation output of 10 for the seventh sample sequence. The results generated by the calculations represented by nodes 934-936 are −8, 8, and 7 respectively. These results are forwarded to the second accumulator sub-unit that determines a correlation value 7 for the second sample sequence group for the eighth sample sequence. The second accumulator sub-unit adds this correlation value with the sum of the previously calculated correlation values to determine a correlation output of −10 for the eighth sample sequence. The results generated by the calculations represented by nodes 944-946 are −8 −7 and 6 respectively. These results are forwarded to the third accumulator sub-unit that determines a correlation value −21 for the second sample sequence group for the ninth sample sequence. The third accumulator sub-unit adds this correlation value with the sum of the previously calculated correlation value to determine a correlation output of −5 for the ninth sample sequence.

FIG. 10 is a table illustrating the exemplary coefficients and sample values from the code sequence and sample on the table in FIG. 6. FIG. 10 also lists the correlation output of the sample sequences. The correlation output for a sample sequence is listed below the first sample value in the sample sequence. In this example, the correlation output processor 170 (shown in FIG. 1), would determine that the correlation output corresponding to the second sample sequence has the highest numerical value. The correlation output processor 170 would determine that the first sample value in the second sample sequence, 2, is the synchronization point for the code sequence.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for managing a code sequence, comprising:
   determining first intermediate correlation values for a first plurality of sample sequences loaded in a plurality of sample sequence registers during a first clock cycle;
   determining second intermediate correlation values for the first plurality of sample sequences during a second clock cycle;
   determining correlation outputs for the first plurality of sample sequences from the first and second intermediate correlation values; and
   determining a synchronization point that identifies an amount of delay incurred from transmission of the sample sequences from the correlation outputs.

2. The method of claim 1, wherein determining the first intermediate correlation values comprises processing coefficients in a first code sequence group in parallel with corresponding sample values in corresponding sample sequence groups from the first plurality of sample sequences.

3. The method of claim 1, wherein determining the second intermediate correlation values comprises processing coefficients in a second code sequence group in parallel with corresponding sample values in corresponding sample sequence groups from the first plurality of sample sequences.

4. The method of claim 1, wherein determining correlation outputs for the first plurality of sample sequences comprises taking a sum of the first and second intermediate correlation values for each of the first plurality of sample sequences.

5. The method of claim 1, further comprising:
   determining first intermediate correlation values for a second plurality of sample values during a third clock;
   determining second intermediate correlation values for the second plurality of sample values during a fourth clock; and
   determining correlation output values for the second plurality of sample value from the first and second intermediate correlation values.

6. The method of claim 1, wherein determining the synchronization point comprises identifying a correlation output having a highest numerical value.

7. A method for managing a code sequence, comprising:
   processing a first group of coefficients in the code sequence, loaded in a plurality of code sequence registers during a first clock cycle, with a first group of contiguous sample values, loaded in a plurality of sample sequence registers, in a received sample to determine a first intermediate correlation value during the first clock cycle;
   processing a second group of coefficients in the code sequence, loaded in the plurality of code sequence registers previously used for the first group of coefficients during a second clock cycle, with a second group of contiguous sample values, loaded in the plurality of sample sequence registers, in the received sample to determine a second intermediate correlation value during the second clock cycle;
   determining a correlation output from the first and second intermediate correlation values; and
   determining a synchronization point that identifies an amount of delay incurred from transmission of the sample values from the correlation output.

8. The method of claim 7, wherein the code sequence comprises L coefficients and the first and second group of coefficients in the code sequence each comprises n coefficients, where L and n may be any value.

9. The method of claim 8, wherein the first and second group of sample values in the received sample each comprises n sample values.

10. The method of claim 7, wherein the first and second group of coefficients in the code sequence are contiguous.

11. The method of claim 7, wherein processing the first group of coefficient in the code sequence with the first group of sample values in the received sample comprises determining a sum of the products of the first group of coefficients in the code sequence with the first group of sample values in the received sample.

12. The method of claim 7, wherein processing the second group of coefficients in the code sequence with the second group of sample values in the received sample comprises determining a sum of the products of the second group of coefficients in the code sequence with the second group of sample values in the received sample.

13. The method of claim 7, wherein determining the correlation output from the first and second intermediate correlation values comprises taking the sum of the first and second intermediate correlation values.

14. The method of claim 7, wherein the first group of contiguous sample values are loaded into a set of sample sequence registers during the first clock cycle and the second group of contiguous sample values are loaded into the set of sample sequence registers during the second clock cycle.

15. The method of claim 7, wherein determining the synchronization point comprises identifying a correlation output having a highest numerical value.

16. A method for managing a code sequence, comprising:
   organizing the code sequence, having L contiguous coefficients, into L/n contiguous code sequence groups having n coefficients each, wherein n and L are greater than 1;
   selecting a number of sample sequences to process in parallel where each of the sample sequences has contiguous sample values from a received sample;
   organizing contiguous sample values from each of a first set of contiguous sample sequences to process in parallel into a first set of contiguous sample sequence groups;
   processing coefficients in each of the code sequence groups loaded into a plurality of code sequence registers in parallel with corresponding sample values in corresponding sample sequence groups from the first set of sample sequences loaded into a plurality of sample sequence registers, where each of code sequence groups is processed during a different clock cycle;
   determining a correlation output for each of the sample sequences; and
   determining a synchronization point that identifies an amount of delay incurred from transmission of the sample sequences from the correlation output.

17. The method of claim 16, further comprising:
organizing contiguous sample values from each of a second set of sample sequences to process in parallel into a second set of contiguous sample sequence groups; and
processing coefficients in each of the code sequence groups in parallel with corresponding sample values in corresponding sample sequence groups from the second set of sample sequences, where each of the code sequence groups is processed during a different clock cycle.

18. The method of claim 16, wherein determining a synchronization point comprises determining a correlation output having a highest numerical value.

19. The method of claim 16, wherein a first sample value in a first sample sequence includes a first sample value in the received sample and each consecutive sample sequence includes a next contiguous sample value in the received sample as a first sample value of the consecutive sample sequence.

20. The method of claim 16, wherein processing comprises determining a sum of the products of the coefficients in each of the code sequence groups with each of the sample values in corresponding sample sequence groups from the first set of sample sequences.

21. The method of claim 16, wherein the code sequence comprises a plurality of L contiguous values.

22. The method of claim 21, wherein the code sequence is organized into a plurality of n code sequence groups.

23. The method of claim 22, wherein a number, d, sample sequences are selected to process in parallel where each of the sample sequences has L contiguous sample values from the sample.

24. The method of claim 23, wherein the first set of sample sequences is organized into a plurality of contiguous sample sequence groups having n values each.

25. The method of claim 16, wherein processing coefficients comprises processing coefficients for L/n clocks.

26. The method of claim 16, wherein each of the code sequence groups are loaded into the same set of code sequence registers.

27. A method for managing a code sequence, comprising:
organizing the code sequence, having L contiguous coefficients, into L/n contiguous code sequence groups having n coefficients each, wherein n and L are greater than 1;
selecting a number of sample sequences, d, to process in parallel where each of the sample sequences has L contiguous sample values from a received sample, where a first sample value in a first sample sequence is a first sample value in the received sample and each consecutive sample sequence includes a next contiguous sample value in the received sample as a first sample value in the consecutive sample sequence;
organizing sample values from each of a first set of d sample sequences into a first set of sample sequence groups having n values each and loading the set into a plurality of sample sequence registers;
processing coefficients in each of the code sequence groups loaded into a plurality of code sequence registers in parallel with corresponding sample values in corresponding sample sequence groups from the first set of d sample sequences, where each of the code sequence groups is processed during a different clock cycle, where d may be any value;
determining a correlation output for each of the sample sequences; and
determining a synchronization point that identifies an amount of delay incurred from transmission of the sample sequences from the correlation output.

28. The method of claim 27, further comprising:
organizing sample values from each of a second set of d sample sequences into a second set of contiguous sample sequence groups having n values each; and processing values in each of the code sequence groups in parallel with corresponding sample values in corresponding sample sequence groups from the second set of d sample sequences, where each of the code sequence groups is processed during a different clock cycle.

29. The method of claim 27, wherein determining a synchronization output comprises determining a correlation output having a highest numerical value.

30. The method of claim 27, wherein the code sequence is organized into L/n groups.

31. The method of claim 27, wherein processing comprises determining a sum of the products of the coefficients in each of the code sequence groups with each of the sample values in corresponding sample sequence groups from the first set of d sample sequences.

32. The method of claim 27, wherein the processing is completed after L/n clocks.

33. A correlator unit, comprising:
a plurality of code sequence registers that store coefficients from a code sequence group having n coefficients, the plurality of code sequence registers storing coefficients from one code sequence group of L/n code sequence groups at a time, where L is the number of coefficients in a code sequence, wherein n and L are greater than 1;
a plurality of sample registers that store sample values from a plurality of sample sequences that are processed in parallel;
a processing unit that processes coefficients in each of the plurality of code sequence groups in the plurality of code sequence registers in parallel with corresponding sample values in corresponding sample sequence groups from a first plurality of sample sequences in the plurality of sample registers, where each of the code sequence groups is processed to generate intermediate correlation values during a different clock cycle;
an accumulation unit that generates a correlation output for each of the sample sequences from the intermediate correlation values generated during the different clock cycles; and
a correlation output processor that determines a synchronization point that identifies an amount of delay incurred from transmission of the sample sequences from the correlation output.

34. The correlator unit of claim 33, wherein the accumulation unit further comprises a plurality of accumulation sub-units each accumulation sub-unit receiving results from the processing unit for a designated sample sequence, each accumulation unit generating a correlation value for the designated sample sequence after each of the code sequence groups are processed.

35. The correlator unit of claim 33, wherein the processing unit processes the coefficients in each of the plurality of code sequence groups in the plurality of code sequence registers in parallel with corresponding sample values in corresponding sample sequence groups from a second plurality of sample sequences in the plurality of sample registers, where each of the code sequence groups is processed during a different clock cycle.

36. The correlator unit of claim 33, wherein the correlation output processor determines a synchronization point from a correlation output having a highest numerical value.

37. The correlator unit of claim 33, wherein the processing unit determines a sum of products of the coefficients in each of the code sequence groups with corresponding sample values in corresponding sample sequence groups.

38. A correlator unit, comprising:
a plurality of n code sequence registers that store n coefficients from a code sequence group, the plurality of n code sequence registers storing coefficients from one code sequence group of L/n code sequence groups at a time, where L is the number of coefficients in a code sequence, wherein n and L are greater than 1;
a plurality of n+d−1 sample registers that store sample values from a plurality of d sample sequences that are processed in parallel, wherein d is greater than 1; and
a processing unit that processes coefficients in each of the plurality of code sequence groups in the plurality of n code sequence registers in parallel with corresponding sample values in corresponding sample sequence groups from a first plurality of d sample sequences in the plurality of n+d−1 sample registers, where each of the code sequence groups is processed to generate intermediate correlation values during a different clock cycle, wherein d may be any value;
an accumulation unit that determines a correlation output for each of the sample sequences from the intermediate correlation values generated during the different clock cycles; and
a correlation output processor to determine a synchronization point that identifies an amount of delay incurred from transmission of the sample sequences from the correlation output.

39. The correlator unit of claim 38, wherein the accumulation unit further comprises an accumulation subunit, corresponding to each of the d sample sequences that are processed in parallel, that receives results from the processing unit for a designated sample sequence and that determines a correlation output for the designated sample sequence after each of the code sequence groups are processed.

40. The correlator unit of claim 38, wherein the processing unit processes the coefficients in each of the plurality code sequence groups in the plurality of n code sequence registers in parallel with corresponding sample values in corresponding sample sequence groups from a second plurality of d sample sequences in the plurality of n+d−1 sample registers, where each of the code sequence groups is processed during a different clock cycle.

41. The correlator unit of claim 39, further comprising correlation output processor that determines a synchronization point for the code sequence from the correlation outputs.

42. The correlator unit of claim 41, wherein the correlation output processor determines a synchronization point from a correlation output having a highest numerical value.

43. The correlator unit of claim 38, wherein the processing unit determines a sum of products of the coefficients in each of the code sequence groups with each of the sample values in corresponding sample sequence groups from the first set of d correlation sequences.

44. The correlator unit of claim 38, wherein the processing is completed after L/n clocks.

45. A correlator unit, comprising:
means for storing coefficients from a code sequence group having n coefficients, the means for storing coefficients from one code sequence group of L/n code sequence groups at a time, where L is a number of coefficients in a code sequence, wherein n and L are greater than 1;
means for storing sample values from a plurality of sample sequences that are processed in parallel;
means for processing coefficients in each of the plurality of code sequence groups in the means for storing coefficients in parallel with corresponding sample values in corresponding sample sequence groups from a first plurality of contiguous sample sequences in the means for storing sample values, where each of the code sequence groups is processed to generate intermediate correlation values during a different clock cycle;
means for determining a correlation output for each of the sample sequences from the intermediate correlation values generated during the different clock cycles; and
means for determining a synchronization point that identifies an amount of delay incurred from transmission of the sample sequences from the correlation output.

* * * * *